(12) United States Patent
Swanson et al.

(10) Patent No.: US 11,971,560 B2
(45) Date of Patent: Apr. 30, 2024

(54) OPTICAL FILM INCLUDING POLYMERIC OPTICAL REFLECTOR AND DISCONTINUOUS TRANSPARENT COATING

(71) Applicant: 3M INNOVATIVE PROPERTIES COMPANY, St. Paul, MN (US)

(72) Inventors: Jeremy O. Swanson, Woodbury, MN (US); Matthew S. Stay, Bloomington, MN (US); Matthew R. D. Smith, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 341 days.

(21) Appl. No.: 17/261,123

(22) PCT Filed: Jul. 15, 2019

(86) PCT No.: PCT/IB2019/056032
§ 371 (c)(1),
(2) Date: Jan. 18, 2021

(87) PCT Pub. No.: WO2020/016752
PCT Pub. Date: Jan. 23, 2020

(65) Prior Publication Data
US 2021/0294005 A1    Sep. 23, 2021

Related U.S. Application Data

(60) Provisional application No. 62/701,389, filed on Jul. 20, 2018.

(51) Int. Cl.
G02B 5/08         (2006.01)

(52) U.S. Cl.
CPC .................................. *G02B 5/0841* (2013.01)

(58) Field of Classification Search
CPC ................. G02B 5/0841; G02B 5/021–5/0221
See application file for complete search history.

(56) References Cited

U.S. PATENT DOCUMENTS

| 3,610,729 A | 10/1971 | Rogers |
| 4,446,305 A | 5/1984 | Rogers |
| 4,540,623 A | 9/1985 | Im |

(Continued)

FOREIGN PATENT DOCUMENTS

| EP | 1465005 | 6/2004 |
| JP | 2013-008657 | 1/2013 |

(Continued)

OTHER PUBLICATIONS

"Vikuiti Enhanced Specular Reflector (ESR)". 3M Optical Systems Division, (2010); pp. 1-2.*

(Continued)

*Primary Examiner* — Prashant J Khatri
(74) *Attorney, Agent, or Firm* — Clifton F. Richardson

(57) ABSTRACT

Optical films are described. In particular, optical films including a broadband polymeric multilayer optical reflector and a discontinuous transparent coating disposed on the broadband multilayer optical reflector, where the discontinuous transparent coating includes an array of dots are described. Such films may provide reduced coefficients of friction while still having high specular reflectivity.

19 Claims, 3 Drawing Sheets

(56) References Cited

U.S. PATENT DOCUMENTS

| | | |
|---|---|---|
| 5,103,337 A | 4/1992 | Schrenk |
| 5,360,659 A | 11/1994 | Arends |
| 5,448,404 A | 9/1995 | Schrenk |
| 5,882,774 A | 3/1999 | Jonza |
| 6,157,490 A | 12/2000 | Wheatley |
| 6,268,961 B1 | 7/2001 | Nevitt |
| 6,368,699 B1 | 4/2002 | Gilbert |
| 6,531,230 B1 | 3/2003 | Weber |
| 6,783,349 B2 | 8/2004 | Neavin |
| 7,104,776 B2 | 9/2006 | Merrill |
| 2003/0169513 A1 | 9/2003 | Kaminsky |
| 2006/0103777 A1 | 5/2006 | Ko |
| 2006/0146566 A1 | 7/2006 | Ko |
| 2006/0152943 A1 | 7/2006 | Ko |
| 2007/0047080 A1 | 3/2007 | Stover |
| 2010/0067257 A1* | 3/2010 | Meis ............ G02B 6/0055 362/624 |
| 2011/0102891 A1 | 5/2011 | Derks |
| 2014/0009961 A1 | 1/2014 | Sakaguchi |
| 2017/0329066 A1* | 11/2017 | Harada ............ G02B 5/0294 |
| 2018/0003873 A1 | 1/2018 | Kim |
| 2019/0137674 A1* | 5/2019 | Okabe ............ G02B 6/0056 |

FOREIGN PATENT DOCUMENTS

| | | |
|---|---|---|
| WO | WO 1995-017303 | 6/1995 |
| WO | WO 1999-039224 | 8/1999 |
| WO | WO 2000-045519 | 8/2000 |
| WO | WO 2010-075383 | 7/2010 |
| WO | WO-2021224735 A1 * | 11/2021 |

OTHER PUBLICATIONS

MacLeod, Thin-Film Optical Filters—Second Edition, Table of Content, 5 Pages (1986).

Thelan, Design of Optical Interference Filters, Table of Content, 5 Pages (1989).

Weber, "Giant Birefringent Optics in Multilayer Polymer Mirrors", Science, Mar. 2000, vol. 287, No. 5462, pp. 2451-2456.

International Search Report for PCT International Application No. PCT/IB2019/056032, dated Nov. 19, 2019, 6 pages.

* cited by examiner

OPTICAL FILM INCLUDING POLYMERIC OPTICAL REFLECTOR AND DISCONTINUOUS TRANSPARENT COATING

BACKGROUND

Optical films may find uses in many visual applications, such as displays and lighting. Polymeric multilayer optical reflectors may be formed by coextruding tens or hundreds of molten polymer layers and orienting them after casting to produce a highly efficient film reflector over a desired wavelength range. Optical films may include additional layers or coatings to provide, for example, physical or optical features.

SUMMARY

In one aspect, the present description relates to an optical film. The optical film includes a broadband polymeric multilayer optical reflector and a discontinuous transparent coating disposed on the broadband multilayer optical reflector, where the discontinuous transparent coating includes an array of dots. In areas of the optical film without the discontinuous transparent coating, the broadband polymeric multilayer optical reflector is exposed to air.

In another aspect, the present description relates to a method of forming an optical film. The method includes providing a broadband polymeric multilayer optical reflector and flexographically printing a discontinuous transparent coating on the broadband polymeric optical reflector, where the discontinuous transparent coating includes an array of dots and such that, in areas of the optical film without the discontinuous transparent coating, the broadband multilayer optical reflector is exposed to air.

DETAILED DESCRIPTION

Figure 1:
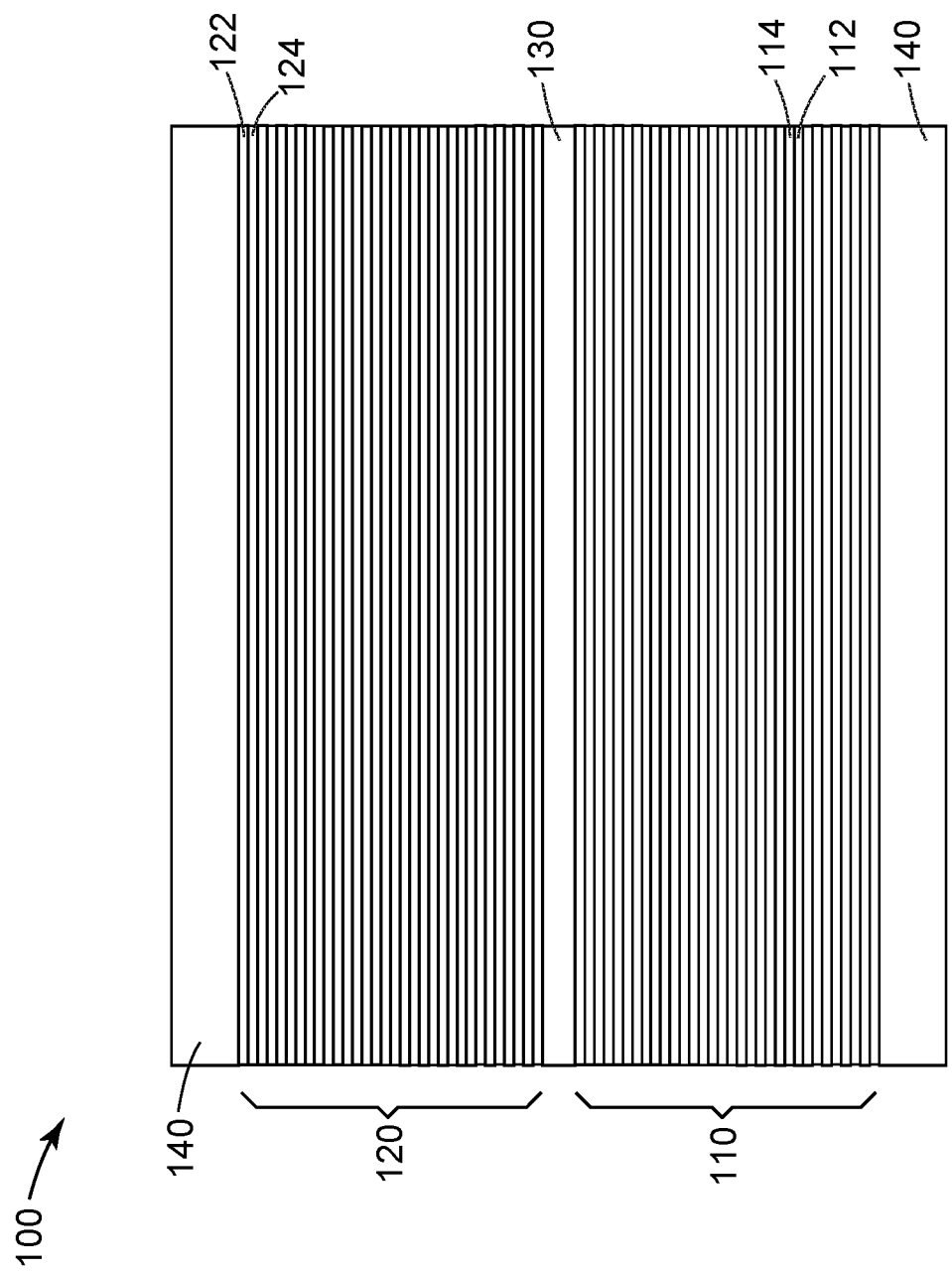
FIG. 1 is a side elevation cross-section of an optical film.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods. The description and examples below relate to these multilayer optical films.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

In some cases, the microlayers have thicknesses and refractive index values providing a ¼-wave stack, i.e., arranged in optical repeat units or unit cells each having two adjacent microlayers of equal optical thickness (f-ratio=50%), such optical repeat unit being effective to reflect by constructive interference light whose wavelength λ is about twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients of the optical repeat units along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

In many applications, the reflection properties of a film may be characterized in terms of "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}(\lambda)$. Characterizing a reflector in terms of its $R_{hemi}(\lambda)$ may be especially convenient for backlight recycling cavities because light is often incident on the internal surfaces of the cavity—whether the front reflector, back reflector, or side reflectors—at all angles. Further, unlike the reflectivity for normal incident light, $R_{hemi}(\lambda)$ is insensitive to, and already takes into account, the variability of reflectivity with incidence angle, which may be very significant for some components within a recycling backlight (e.g., prismatic films).

It is understood that for numerous electronic display applications using backlights, and that for backlights for general and specialty lighting applications, it may be desirable for the reflector film forming the backlight's backplane to have high reflectivity characteristics. Indeed, it is further understood that the hemispheric reflectivity spectrum, $R_{hemi}(\lambda)$, strongly correlates with light output efficiency of a backlight; the higher the $R_{hemi}(\lambda)$ value across the visible light spectrum, the higher the output efficiency of the backlight. This is particularly true for recycling backlights, where other optical films may be configured over the backlight exit aperture to provide collimated or polarized light output from the backlight.

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices $n_{1y}$ and $n_{2y}$. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Polymeric multilayer optical films as described herein may be highly reflective; for example, they may reflect more than 95% or 99% or even 99.5% of visible unpolarized light, as measured at normal incidence. Visible light may be characterized as wavelengths between 400 nm and 700 nm, or in some cases between 420 nm and 700 nm. Further, polymeric multilayer optical films as described herein may be thin—in some cases, thinner than 105 μm, 90 μm, or 70 μm. In embodiments where the polymeric multilayer optical film includes a third optical packet, the film may be thinner than 165 μm.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.).

In some embodiments, an anti-wetout layer may be disposed proximate an external side of the multilayer optical film. The anti-wetout layer may be a particle-containing layer as described, for example, in U.S. Pat. No. 6,268,961.

One optical packet may be disposed on another optical packet. In some embodiments, the multilayer optical film may include a third optical packet, which may be disposed on the second optical packet. Disposed in this sense means optically coupled, and one packet need not be directly and fully in contact with the other in order to be considered disposed. For example, the packets may be adhered to one another with a pressure sensitive adhesive or an optically clear adhesive, or they may be separated by a skin layer or a protective boundary layer.

In certain embodiments where optical films described herein are used in a backlight, such films may be placed next to a lightguide. Lightguides, commonly used with edge-lit backlights in particular, have conventionally been transparent plastic (injection molded or otherwise formed polycarbonate or acrylic, for example) configured to spread injected light (typically from one or more light sources, such as LEDs) substantially uniformly over an extended area. As backlights trend toward thinner and thinner stack construction, lightguides have begun to transition from light guide plates (LGPs) to light guide films (LGF). These lightguide films are typically an optically transparent substrate (for example, polycarbonate, acrylic, or any other suitable polymeric film) with a microreplicated structure on both sides. Certain resins used to microreplicate patterns, such as a light extraction structures, may be incompatible with convention polymeric multilayer optical films. Optical films may in some cases have an unacceptably high coefficient of friction that damages the microreplicated structures of the LGF. In some cases, bead coatings or other continuous diffuse coatings may reduce friction, but may still be unacceptably hard and may scratch or damage the LGF. Also, these coatings provide a diffuse reflectivity component to the optical film and as such may unacceptably reduce performance, particularly in turning film backlights, where precise angular control of light is critically important. Surprisingly, optical films described herein possess not only a reduced coefficient of friction but also excellent specular reflectivity, ensuring both good optical and physical performance.

FIG. 1 is a side elevation cross-section of an optical film; specifically a broadband polymeric multilayer optical reflector. Optical film 100 includes first optical packet 110 and second optical packet 120 separated by protective boundary layer 130 and including skin layers 140. The first optical packet includes alternating first polymer layers 112 and second polymer layers 114, and the second optical packet includes alternating third polymer layers 122 and fourth polymer layers 124. In some embodiments, the first and third polymer layers may be or include the same material, and/or the second and fourth polymer layers may be or include the same material. Each of the optical packets includes alternating polymer layers that, together and/or separately reflect light over a desired broadband range through constructive interference. In some embodiments, the first and second optical packets may differ only through the physical thicknesses of some of their respective layers. Typically, there is no adhesive between the first and second optical packet. Instead, the two packets—along with optional protective boundary layer 130 between the two portions and optional skin layers 140 protecting the alternating optical layers from processing and shear force of extrusion and roller contact—are coextruded and oriented or otherwise formed at the same time.

Figure 2:
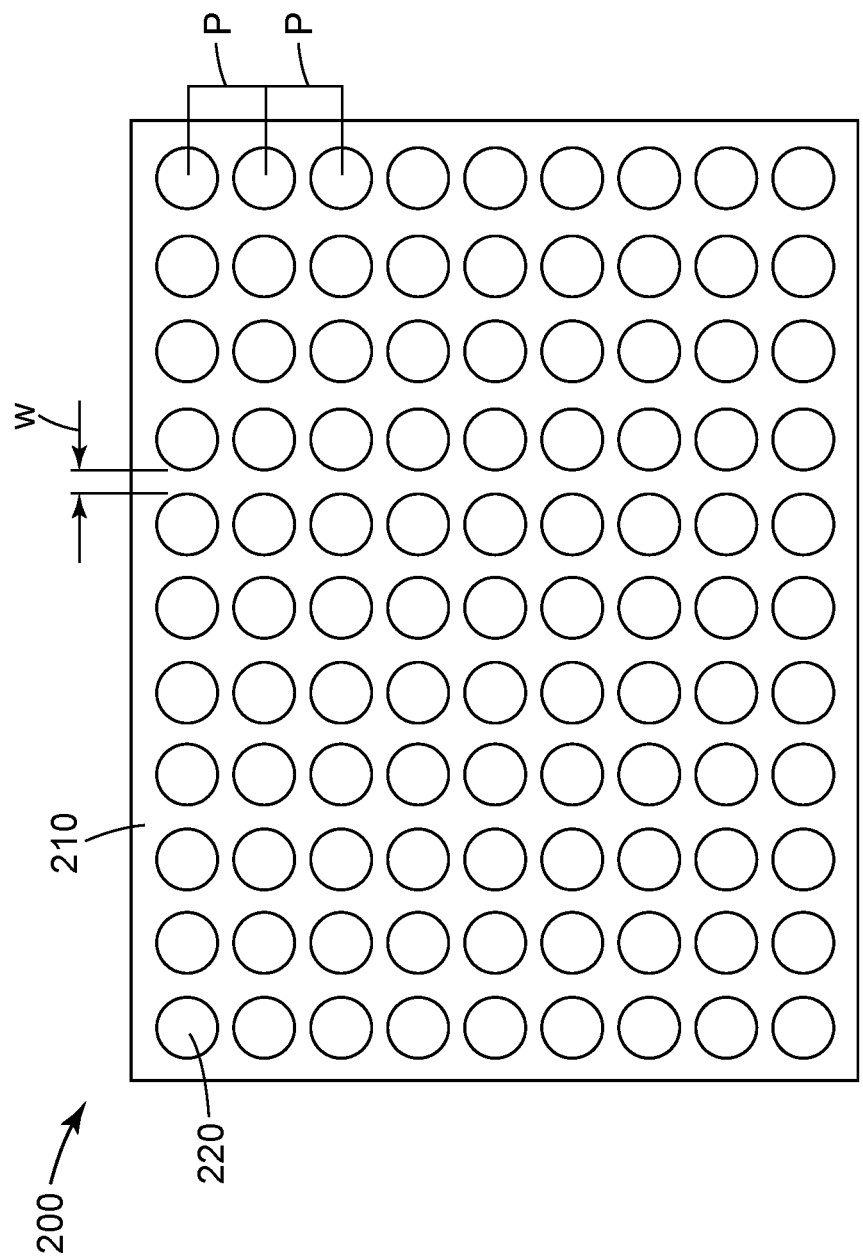
FIG. 2 is a top plan view of an optical film including a polymeric optical reflector and a transparent discontinuous coating.

FIG. 2 is a top plan view of an optical film including a polymeric optical reflector and a transparent discontinuous coating including an array of dots. In FIG. 2, optical film 200 is characterized by a plurality of transparent dots 220 disposed on a major surface of broadband polymeric multilayer optical reflector 210. Transparent dots 220 may be any shape or size and may be arranged regularly or irregularly. In some embodiments, each of transparent dots 220 is the same size and shape. In some embodiments, one or more of the size and shape of transparent dots 220 vary over one or more dimensions of optical film 200. In some embodiments, one or more of the size and shape of the transparent dots may vary monotonically or smoothly over at least one non-thickness direction. In some embodiments, one or more of the size and shape of the transparent dots may vary nonperiodically or pseudorandomly.

In some embodiments, the transparent dots are formed by flexographically printing an ink or coating onto the surface of a broadband polymeric multilayer optical reflector. In some embodiments, a glossy or otherwise non-diffuse transparent ink may be used. The ink or coating may be curable through the application of radiation; for example, heat curable, light curable, or specifically UV curable. In some embodiments, the transparent dots may have a maximum height of less than 10 micrometers. In some embodiments, the transparent dots may have a maximum height of less than 5 micrometers. In some embodiments, the transparent dots may have a maximum height of less than 3 micrometers. In some embodiments, the transparent dots may have a maximum height of less than 2 micrometers. The thickness of the flexographically printed feature may be controlled by varying the volume of the channels in the anilox roll used to meter ink to the printing plate for printing on the substrate (i.e., the broadband polymeric multilayer optical reflector) surface. In some embodiments, other printing methods may be used to create the same or similar transparent dots, including digital printing, screen printing, gravure printing, stencil printing, lithographic printing, or any other printing method.

For regularly arranged dots, as those shown in FIG. 2, these can be characterized by a width w between dots corresponding to an average border thickness and a pitch P which is the space between the areal center of one dot to its next neighbors. In some embodiments, particularly where pitch and/or width is non-constant over the entire optical film, both pitch and width can be averaged over the film. In some embodiments, to avoid characterizing dots near the edge which may require a different configuration for film processing or conversion, the characterization of the width and pitch may be done for a limited portion near the center of the film, such as a 1 mm×1 mm square or a 5 mm×5 mm square, ignoring any dots only partially within that area.

Even for dots that may not be regularly arranged or may vary over one or more non-thickness directions of the perforated layer, an average border thickness (width) and pitch can be computed and characterized for the film.

The specific dot arrangement can lead to the calculation of the surface area covered by the transparent dots. For example, in some embodiments, more than 20% of the surface area of the optical film is covered by transparent dots. In some embodiments, more than 50% of the surface area of the optical film is covered by transparent dots. In some embodiments, between 20% and 90% of the surface area of the optical film is covered by transparent dots. In some embodiments, in areas without the transparent discontinuous coating (i.e., in the embodiment of FIG. 2, in areas without transparent dots), the broadband polymeric multilayer optical reflector is exposed to air. In some embodiments, in areas without the transparent discontinuous coating, the optical film is greater than 90%, greater than 95%, or even greater than 99% specularly reflective for light incident at 60 degrees.

Figure 3:
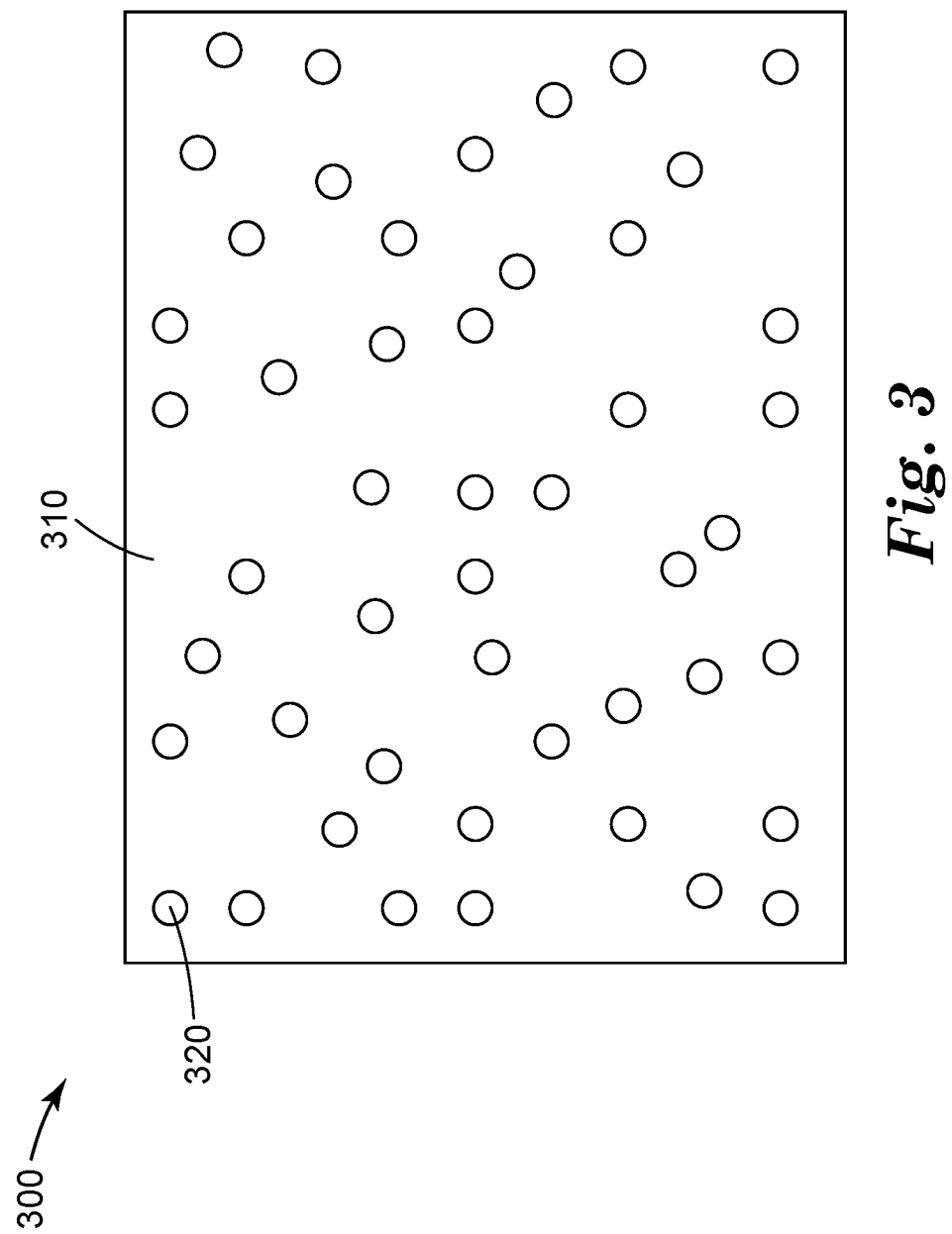
FIG. 3 is a top plan view of another optical film including a polymeric optical reflector and a transparent discontinuous coating.

FIG. 3 is a top plan view of another optical film including a polymeric optical reflector and a transparent discontinuous coating, including a plurality of transparent dots. Optical film 300 includes broadband polymeric multilayer optical reflector 310 and array of transparent dots 320. FIG. 3 is similar to FIG. 2, however, the arrangement of transparent dots 320 illustrates an exemplary embodiment where the dots are disposed nonperiodically. In such cases, it may not be possible to meaningfully characterize the border width between adjacent transparent dots, or a pitch. In some embodiments, the size and shape of transparent dots 320 may also vary periodically across one or more non-thickness directions of the polymeric multilayer optical film, or non-periodically. Depending on the desired application, a particular shape, size, and placement configuration of the transparent dots may be determined as suitable or unsuitable, for one or more reasons such as pattern visibility or insufficient coefficient of friction reduction.

EXAMPLES

The printing process used to print the discrete array of transparent dots utilized a flexographic printing deck manufactured by Retroflex Inc. (Wrightstown, Wis., USA). The flexographic printing deck was set up using the following process conditions and materials to print all examples:

(1) a 3.0 billon cubic micrometers/square inch (BMC/in$^2$), 900 lines/inch anilox roll fabricated by Interflex Laser Engravers (Spartanburg, S.C., USA),
(2) 67 mil thick Dupont Cyrel DPR flexograhic printing plates (available from Dupont, Wilmington, Del., USA) with a various designed relief patterns, as described in the specific examples (produced by SGS Inc., Brooklyn Park, Minn., USA),
(3) the substrate for the printed examples was ESR-80v2 multilayer optical reflector (available from by 3M, St. Paul, Minn., USA),
(4) the printing ink used to form the dot patterns was Nazdar OP1028 Premium Gloss HS Overprint Varnish (manufactured by Nazdar Ink Technologies, Shawnee, Kans., USA), and
(5) the mounting tape for applying the stamp to the flexographic printing plate roll was 3M E1060H CUSHION-MOUNT mounting tape (available from 3M, St. Paul, Minn., USA).

The 14-inch wide ESR substrate was first loaded onto the flexographic printing line and put under tension at approximately 1 pound per linear inch of tension. Next, the line was run at 50 feet per minute to transport the web through the printing deck. After printing, the substrate with the simple array of transparent dots was sent through a UV curing chamber available from Xeric Web Drying Systems (Neenah, Wis., USA). The arc bulb power was set to 30% relative to maximum bulb output. The cured and solidified transparent dot pattern on the ESR substrate was subsequently wrapped up into a wound roll.

Test Methods

Specular reflectivity was measured on the LAMBDA 1050 UV/Vis spectrophotometer equipped with integrating sphere available from Perkin Elmer (Waltham, Mass., USA) and is defined as total reflectance minus the diffuse reflectance where reflectivity is defined as the average reflectivity over 400 nm to 800 nm spectral range. The samples for these measurements were 75 mm×75 mm coupons and the reflectivity standard was a NIST 2054 specular reflector.

Coefficient of friction is measured on an SP-2100 Slip/Peel Tester with coefficient of friction (COF) sled attachment available from IMASS, Inc. (Accord, Mass., USA). The test method used is a modification of ASTM-D1894 "Static and Kinetic coefficients of friction of plastic film and sheeting" but is in accordance with the standard operating procedure of the instrument. The sample for this measurement was 2.5 inches by 2.5 inches (63.5 mm by 63.5 mm) in dimension. The test procedure proscribed for slip coefficient of friction used a 200 g sled and 6 inches per minute velocity (152 mm/minute) and reported static peak value. Curl was measured by evaluating corner edge lift. To measure corner edge lift, the sample is deionized and placed on a flat surface. Then, the maximum corner lift is evaluated and recorded.

Example Configurations

Example 1 used a flexographic printing plate with a designed pattern of rectilinear dots with a 0.125 mm diameter and center-to-center spacing of 0.250 mm. This produced a rectilinear array of printed features with height 0.002 mm and an approximate diameter 0.125 mm with equal pitch of 0.250 mm.

Example 2 used a flexographic printing plate with a designed pattern of rectilinear dots with a 0.125 mm diameter and center-to-center spacing of 0.156 mm. This produced a rectilinear array of printed features with height 0.002 mm and an approximate diameter 0.125 mm with equal center-to-center spacing of 0.250 mm. Curl was not evaluated.

Example 3 used a flexographic printing plate with a designed pattern of hexagonally arrayed dots with a 0.100 mm diameter and center-to-center spacing of 0.200 mm. This produced a hexagonal array of printed features with height 0.002 mm and an approximate diameter 0.100 mm with equal center-to-center spacing of 0.200 mm. Curl was not evaluated.

Comparative Example 1 is a bare ESR-80v2 multilayer optical film available from 3M (St. Paul, Minn.) without any printed surface features.

Comparative Example 2 is EDR-95v2 from 3M (St. Paul, Minn.) which is an ESR multilayer optical film substrate with a white, multi-layered bead coating to provide diffusion.

Test Measurements

| Example | Specular Reflectivity | Coefficient of Friction | Curl (mm) |
|---|---|---|---|
| Ex-1 | 97.05 | 0.36 | 0.09 |
| Ex-2 | 96.35 | 0.26 | — |
| Ex-3 | 96.60 | 0.21 | — |
| CE-1 | 98.49 | 0.52 | 0.10 |
| CE-2 | 8.18 | 0.41 | 0.47 |

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical film, comprising:
   a broadband polymeric multilayer optical reflector; and
   a discontinuous transparent coating disposed on the broadband multilayer optical reflector, wherein the discontinuous transparent coating includes an array of dots;
   wherein, in areas of the optical film without the discontinuous transparent coating, the broadband multilayer reflector is exposed to air; and
   wherein the optical film has a coefficient of friction of less than 0.4.

2. The optical film of claim 1, wherein the dots are regularly spaced.

3. The optical film of claim 1, wherein the dots are irregularly spaced.

4. The optical film of claim 1, wherein the dots cover more than 20% but less than 90% of the surface of the optical film.

5. The optical film of claim 1, wherein the optical film specularly reflects more than 95% of unpolarized light over all angles of incidence averaged from 400 nm to 700 nm.

6. The optical film of claim 1, wherein the optical film specularly reflects more than 96% of unpolarized light over all angles of incidence averaged from 400 nm to 700 nm.

7. The optical film of claim 1, wherein the optical film specularly reflects more than 97% of unpolarized light over all angles of incidence averaged from 400 nm to 700 nm.

8. The optical film of claim 1, wherein the coefficient of friction is less than 0.3.

9. The optical film of claim 1, wherein the coefficient of friction is less than 0.25.

10. The optical film of claim 1, wherein the discontinuous transparent coating does not include beads.

11. The optical film of claim 1, wherein the broadband polymeric multilayer optical reflector is thinner than 105 micrometers.

12. The optical film of claim 1, wherein the broadband polymeric multilayer optical reflector is thinner than 90 micrometers.

13. The optical film of claim 1, wherein the broadband polymeric multilayer optical reflector is thinner than 70 micrometers.

14. The optical film of claim 1, wherein the corner edge lift of less than 0.1 mm.

15. A backlight, comprising the optical film of claim 1 and a lightguide, wherein the lightguide and the optical film are disposed such that the lightguide and the optical film are in contact.

16. An optical film, comprising:
    a broadband polymeric multilayer optical reflector; and
    a discontinuous transparent coating disposed on the broadband multilayer optical reflector, wherein the discontinuous transparent coating includes an array of dots;
    wherein the optical film specularly reflects more than 95% of unpolarized light over all angles of incidence averaged from 400 nm to 700 nm and has a coefficient of friction of less than 0.40.

17. The optical film of claim 16, wherein the dots are regularly spaced.

18. The optical film of claim 16, wherein the dots cover more than 20% but less than 90% of the surface of the optical film.

19. A method of forming an optical film, comprising:
    providing a broadband polymeric multilayer optical reflector;
    flexographically printing a discontinuous transparent coating on the broadband polymeric optical reflector, wherein the discontinuous transparent coating includes an array of dots and such that, in areas of the optical film without the discontinuous transparent coating, the broadband multilayer reflector is exposed to air, and wherein the coefficient of friction of less than 0.4.

* * * * *